(12) United States Patent  (10) Patent No.: US 6,619,146 B2
Kerrebrock  (45) Date of Patent: Sep. 16, 2003

(54) TRAVELING WAVE GENERATOR (75) Inventor: Peter Kerrebrock, Hingham, MA (US)

(73) Assignee: The Charles Stark Draper Laboratory, Inc., Cambridge, MA (US)

( * ) Notice: Subject to any disclaimer, the term of this patent is extended or adjusted under 35 U.S.C. 154(b) by 99 days.

(21) Appl. No.: 09/923,585

(22) Filed: Aug. 7, 2001

(65) Prior Publication Data

US 2003/0029257 A1 Feb. 13, 2003

(51) Int. Cl.$^7$ .............. A16F 2/54; E02F 9/20; B25J 19/06
(52) U.S. Cl. .......... 74/25; 74/490.03; 901/25; 901/28; 446/376
(58) Field of Search ............... 74/25, 53, 55, 74/490.01, 490.03, 490.05, 490.12; 446/368, 376, 330, 102; 414/744.5, 735; 901/15, 25, 28, 29; 114/332; 472/72; 128/33; 73/12

(56) References Cited

U.S. PATENT DOCUMENTS

| 857,593 | A | * | 6/1907 | Brown | 446/330 X |
| 2,035,308 | A | * | 3/1936 | Ferber | 446/102 X |
| 2,194,537 | A | * | 3/1940 | Adams | 446/368 X |
| 2,773,498 | A | * | 12/1956 | Himmelman | 128/33 |
| 3,964,316 | A | * | 6/1976 | Abe | 73/12 |
| 4,107,948 | A | * | 8/1978 | Molaug | 414/7 X |
| 4,236,711 | A | * | 12/1980 | Klingbeil | 472/72 |
| 4,724,716 | A | * | 2/1988 | Kawai | 414/735 |
| 4,775,351 | A | * | 10/1988 | Provenzano, Jr. | 446/368 X |
| 4,805,477 | A | * | 2/1989 | Akeel | 901/28 |
| 5,326,369 | A | * | 7/1994 | Schectman | 74/490.03 |
| 5,456,568 | A | * | 10/1995 | Kirby et al. | 74/490.03 X |
| 6,138,604 | A | * | 10/2000 | Anderson et al. | 114/332 |
| 6,543,307 | B2 | * | 4/2003 | Ambrose | 74/490.03 |

* cited by examiner

Primary Examiner—David A. Bucci
Assistant Examiner—Colby Hansen
(74) Attorney, Agent, or Firm—Iandiorio & Teska (57) ABSTRACT A traveling wave generator includes at least a base link and end link and an intermediate link; a pivot device pivotably interconnecting each pair of links; a drive mechanism interconnecting each pair of links including a drive shaft and a cam on the first link of the pair and on the second link of the pair a follower for engaging the cam for inducing a traveling wave motion in the links; a flexible power transmission device interconnects the shafts of each of the base and intermediate links; and a motive source rotates the shafts.

13 Claims, 13 Drawing Sheets

Link motion shown 90° out of plane, increasing link amplitude

TRAVELING WAVE GENERATOR

FIELD OF THE INVENTION

This invention relates to a traveling wave generator and more particularly to such a generator which generates a planar traveling wave in a flexible body such as a robotic fish tail or snake.

BACKGROUND OF THE INVENTION

Currently robotic fish and snake-like vehicles typically consist of a flexible body surrounding a multitude of rigid links connected in series, much like the spine of the animal that the vehicle emulates. The motion of each link is controlled by at least one dedicated actuator, as it is in the biological model, e.g., U.S. Pat. No. 6,138,604.

This approach requires a large number of actuators that must be coordinated to generate the desired vehicle motion. Such a device requires some form of logic generator such as a microprocessor, as well as a power distribution network to supply the individual actuators with power. Often there is a problem with fitting actuators in the confined spaces of the vehicle, such as at the end of a fish or snake-like tail. These problems result in a costly, and often large, heavy and complicated mechanism that may not perform as desired.

BRIEF SUMMARY OF THE INVENTION

It is therefore an object of this invention to provide an improved traveling wave generator.

It is a further object of this invention to provide such an improved traveling wave generator which is small, compact, light, simple and less costly.

It is a further object of this invention to provide such an improved traveling wave generator which requires only a single motion source and one which can run at constant speed.

It is a further object of this invention to provide such an improved traveling wave generator which can be employed in a fish or snake-like device.

It is a further object of this invention to provide such an improved traveling wave generator which allows for a wide range of resulting wave shape and propagation envelope.

The purpose of the invention is to provide a simple means of generating a planar traveling wave in a flexible body, such as a robotic fish tail or snake. The invention uses a single actuator, or motor, to drive links connected in series that comprise the mechanism, but the invention allows for a greater range in resulting wave shape. The invention is capable of generating a traveling wave in a flexible body such as a fish or snake-like tail using a single actuator, or motor, to drive a multitude of links. The device requires no logic to perform this function. The invention provides a simple, low cost solution to the problem of mechanizing small fish and snake-like robots. The invention consists of a series of rigid links connected in series and hinged such that the assembly can bend in a single plain. The invention must contain at least two links, but there is no theoretical limit to the total number of links in the invention. Traveling down the center of the links may be a rotating shaft, made up of a series of rigid elements connected by universal or constant-velocity joints. The centers of the joints are coincident with the hinge axes between the links. This arrangement allows the shaft to turn freely as the angles between the links are moved through arbitrary small angles. Near the rearward end of each shaft is located an eccentric cam that turns with the shaft and engages a race, or slot, in the end of the next link in the mechanism. As the shaft in the first link revolves, the cam imparts an oscillating motion to the second link. The shaft in the second link imparts an oscillating motion to the third link (if there is one), and so on. The phasing and amplitude of the link motions can be adjusted by the angular and axial position of the eccentric cams on the shafts, respectively. The invention provides a simple, low cost method of actuating a fish or snake-like robotic vehicle, which has formerly required a much more complex and costly mechanism. The invention also provides a means of miniaturizing such robotic vehicles, which would be very difficult using the former methods.

The invention results from the realization that a truly simple and effective traveling wave generator can be made using at least a base link, an end link and an intermediate link pivotably interconnected to oscillate in a plane with a drive mechanism that interconnects each pair of links including a drive shaft and a cam on a first link of the pair and on the second link of the pair a follower for engaging the cam to include a traveling wave motion in the links; a flexible power transmission device interconnects the shafts of each of the base and intermediate links to drive them from a motion source.

This invention features a traveling wave generator including at least a base link, an end link and an intermediate link. A pivot device pivotably interconnects each pair of links. A drive mechanism interconnects each pair of links and includes a drive shaft and a cam on the first link of the pair and on the second link of the pair a follower for engaging the cam for inducing a traveling wave motion in the links. A flexible power transmission device interconnects the shafts of each of the base and intermediate links and a motive source rotates the shafts.

In a preferred embodiment the pivot devices may be in the same plain and the induced traveling wave may be in a single plain. The cam may be spherical or semispherical. The drive mechanism may include an adjustment device for setting the relative phase orientation of the cams on their shafts to define the wavelength of the traveling wave. The drive mechanism may include an adjustment device for setting the position of the cams along their shafts to define the envelope within which the traveling wave propagates. The flexible power transmission device may include a universal joint or may include a constant velocity joint. The axes of the flexible power transmission devices may be aligned with the associated pivot devices in each link. The motive source may drive the shaft of the base link or may drive any one of the other shafts of the interconnected links. The links may have different lengths for defining the envelope within which the traveling wave propagates. The cam may be cylindrical and the follower may be pivotable.

BRIEF DESCRIPTION OF THE DRAWINGS

Other objects, features and advantages will occur to those skilled in the art from the following description of a preferred embodiment and the accompanying drawings, in which.

PREFERRED EMBODIMENT

Figure 1:
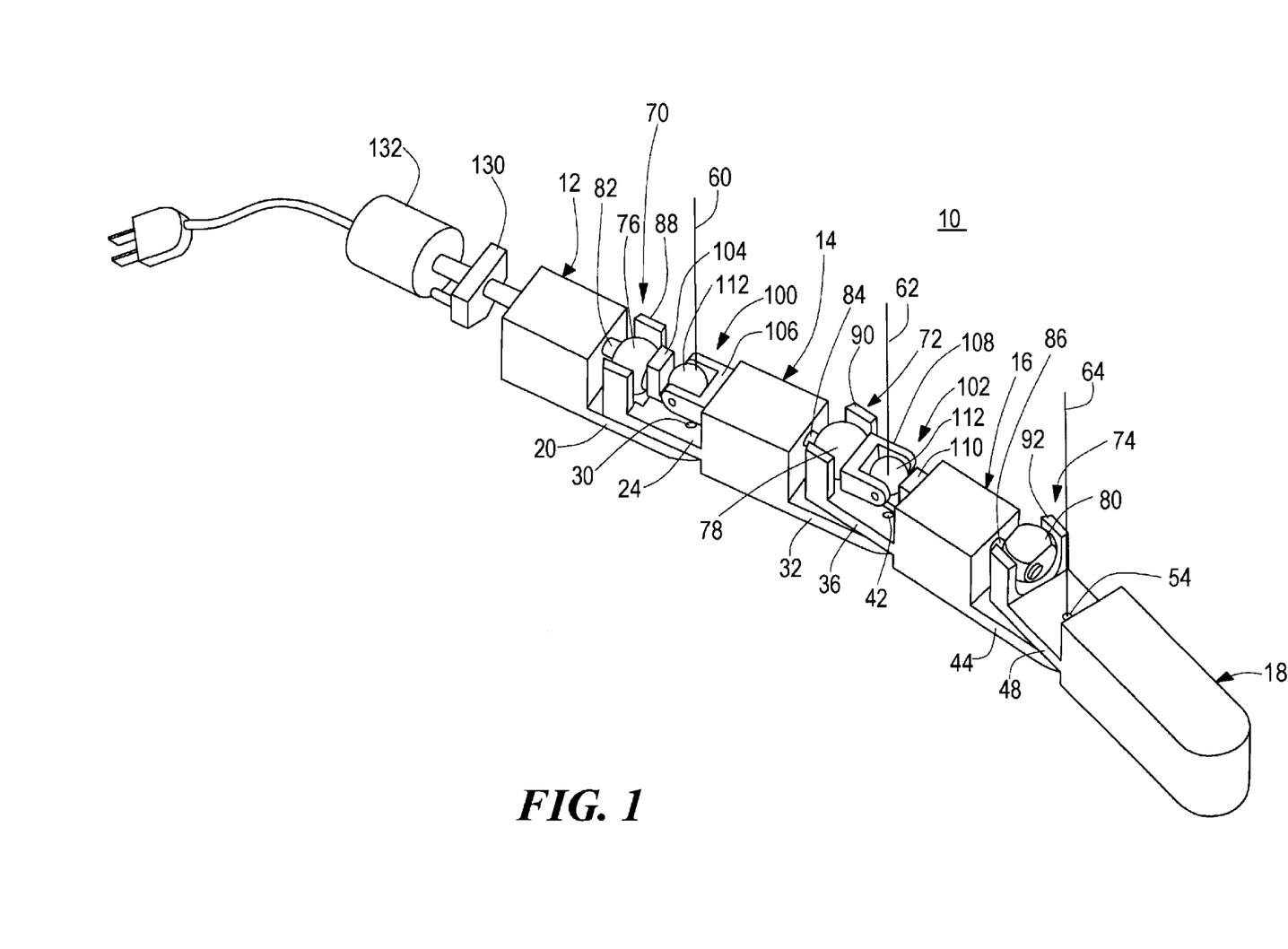
FIG. 1 is a three dimensional schematic view with portions broken away of a traveling wave generator according to this invention.
Figure 2:
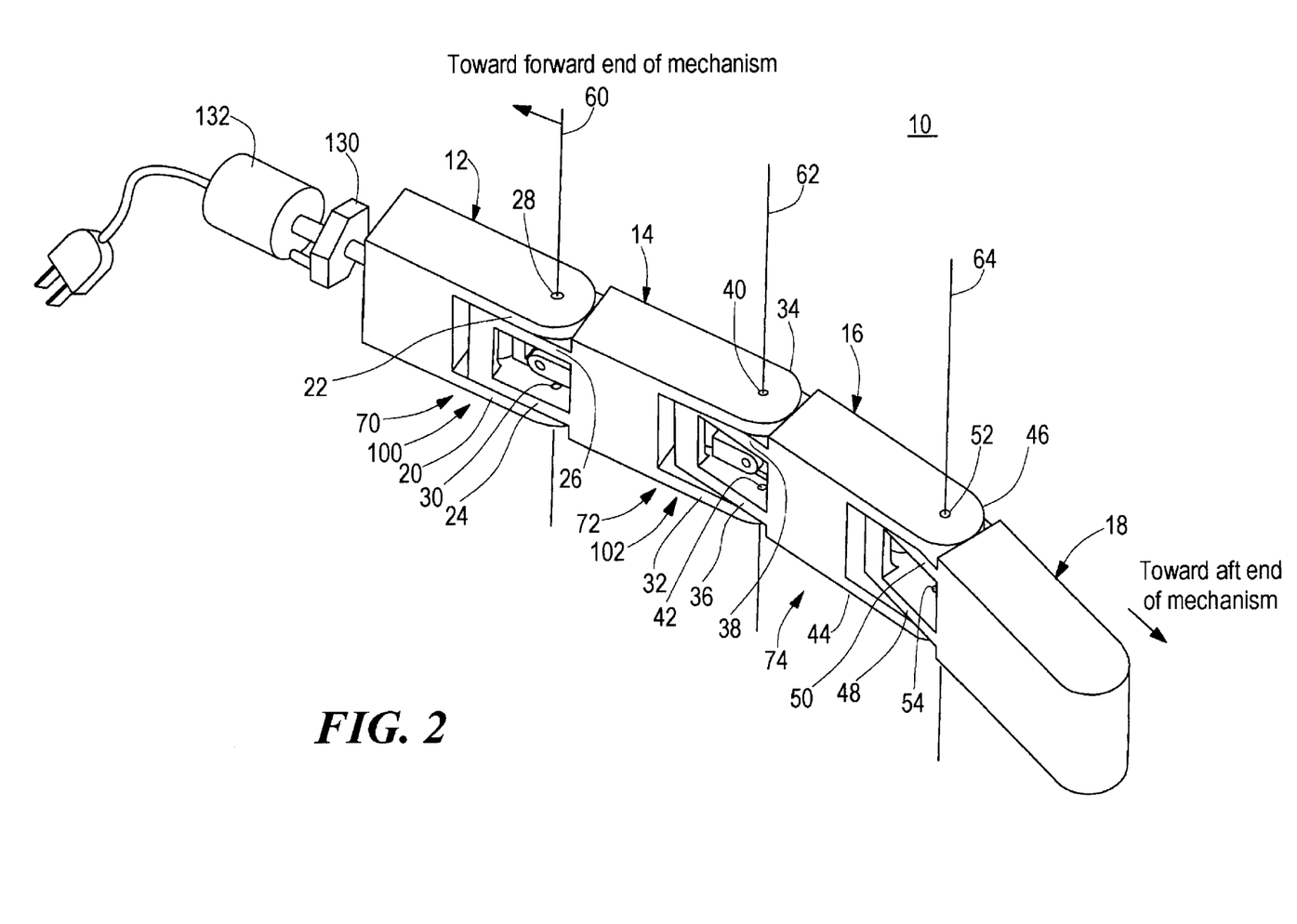
FIG. 2 is a three dimensional schematic full view of a traveling wave generator of FIG. 1.

There is shown in FIGS. 1 and 2 a traveling wave generator 10 according to this invention including a base link 12, two intermediate links 14 and 16, and an end link 18. Base link 12 includes two rearward projecting arms; lower arm 20, and upper arm 22 which engage with the forward lower arm 24 and forward upper arm 26 of intermediate link 14. The upper arms 22 and 26 are pivotably interconnected by hinge pin 28 while the lower arms 20 and 24 are pivotably interconnected by hinge pin 30. The rearward lower 32 and upper arms 34 likewise engage forward lower 36 and upper 38 arms of intermediate links 16. Upper arms 34 and 38 are pivotably interconnected by hinge pin 40 while lower arms 32 and 36 are pivotably interconnected by hinge pin 42. Rearward lower arm 44 and upper arm 46 similarly engage the forward lower arm 48 and upper arm 50 of end link 18. The upper arms 46 and 50 are pivotably interconnected by hinge pin 52 and the lower arms 44 and 48 are interconnected by hinge pin 54. The hinge pins 28 and 30 are not continuous but do align with hinge pin axis 60. The same is the case for hinge pins 40 and 42 which align with axis 62, and hinge pins 52 and 54 which align with hinge pin axis 64.

Interconnecting each pair of links 12 and 14, 14 and 16, 16 and 18 is a drive mechanism 70, 72, 74. Each drive mechanism 70, 72, 74 includes a cam which may be spherical cam 76, 78, 80 on shaft 82, 84, 86 and engaging with cam follower 88, 90, 92, all respectively, and shown to better advantage in FIG. 1 where the top arms have been removed for clarity. Although this cam is shown as spherical to accommodate the traveling wave motion of the link, this is not a necessary limitation of the invention as can be seen later, semispherical or more conventional cylindrical cams can be used. As each cam is rotated eccentrically by its shaft, it drives the follower laterally left and right to create the traveling wave as will be seen subsequently. A flexible power transmission device 100, 102 interconnects the base link 12 and intermediate links 14 and 16. These transmission devices interconnect the shaft from the preceding cam to the shaft of the next link which drives the next succeeding cam and may be typically, as shown in FIGS. 1 and 2, a conventional universal joint or it could be a flexible member such as a plumber's snake or a constant velocity device, for example.

Each universal joint includes first and second yokes 104, 106, 108, 110 and a cross piece 112 between them arranged in a conventional fashion. The axis of the universal joint or any other flexible power transmission device ideally aligns here with the axis of the hinge pins 60 and 62. There is no flexible power transmission device between link 16 and the end link 18 since there is no further need for the drive power to be communicated to another drive shaft. In this particular embodiment the drive shafts may be driven by a hand crank 130 or a conventional electric motor 132. Although the motive source or drives 130 and 132 are shown connected at base link 12, this is not a necessary limitation of the invention as the motive source could be placed anywhere so long as it is engages and drives at least one of the shafts which is interconnected with the others.

In operation as motor 132 or crank 130 drives shaft 82 it, through universal joint 100, drives shaft 84 which in turn, through universal joint 102, drives shaft 86, which in turn drives cam 80. Each of the shafts 82, 84, and 86 drive their respective cams 76, 78, and 80. These cams engage with their followers 88, 90, and 92 to drive the followers back and forth about pivot axes 60, 62, and 64 and thereby create the traveling wave.

Figure 3:
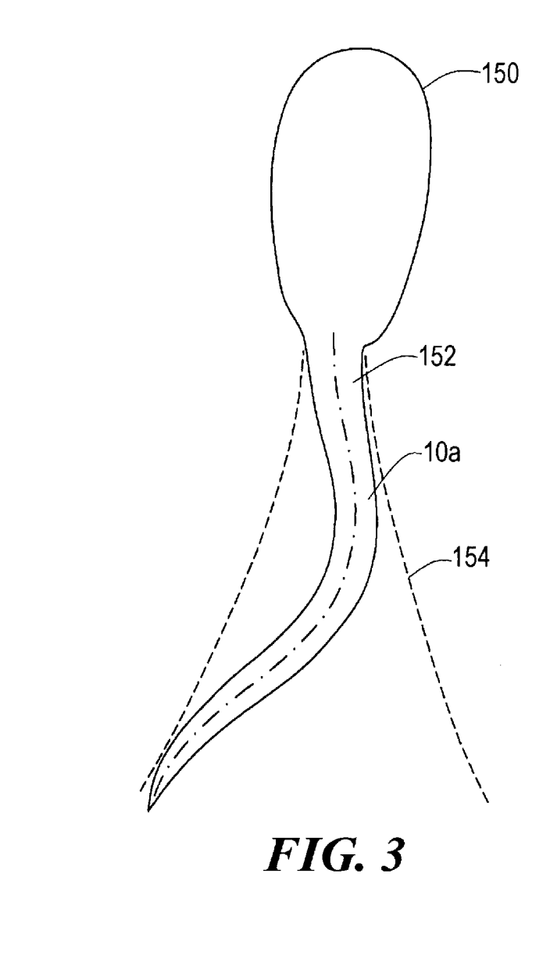
FIG. 3 is a schematic top plan view of an aquatic device employing the traveling wave generator of this invention illustrating the envelope of the traveling wave.

The traveling wave generator according to this invention may be employed in aquatic-like device 150, FIG. 3, shaped like a tadpole wherein the tail 152 actually contains the traveling wave generator 10a according to this invention. The envelope 154 in which the traveling wave propagates can be defined by adjusting the distances $l_1$, $l_2$, $l_3$, FIG. 4, between the cams 76a, 78a and 80a and the axes 60a, 62a, and 64a, respectively, of the universal joint or other device 100a and 102a. The closer a cam is to the axis the greater the amplitude of the traveling wave; thus cam 76a being far from axes 60a creates a lesser amplitude than cam 78a which is somewhat more distant from axes 62a, whereas cam 80a being extremely close to axes 64a creates the greatest amplitude. The adjustability of the cams could be very simply done by an adjusting element such as a set screw 156, 158, 160. The envelope in which the traveling wave propagates may also be defined or controlled by varying the lengths $L_1$ and $L_2$, FIG. 5, where the increasing lengths of the shafts 82b, 84b, 86b, increases the amplitude of each succeeding link.

Figure 6:
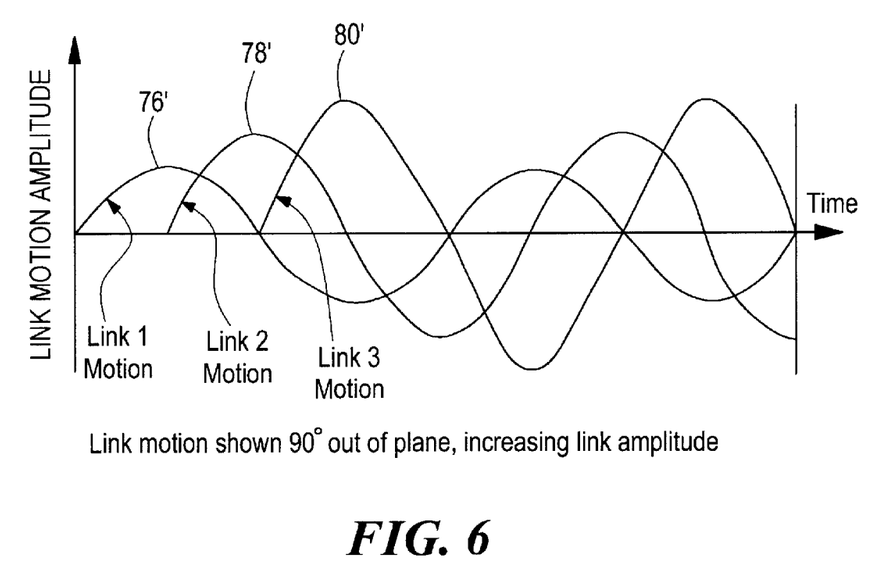
FIG. 6 is an illustration of variation of the link motion amplitude with 90° phase shifts between cam orientations and increasing link amplitude.

The motion of links 14, 16 and 18 as shown at 76', 78' and 80', FIG. 6, where the cams 76, 78 and 80 are phased at 90°, is determined by the phase relationship between the cams on their shafts. For example, the waveform 76', 78' 80' for each cam 76, 78, 80 show a phase relationship of 90°. This is shown in FIG. 7 where each cam 76c, 78c, 80c is set at 90° with respect to the neighboring cam; the wave form developed is a half wave length and the cams in an end view appear as shown in FIG. 8.

Figure 4:
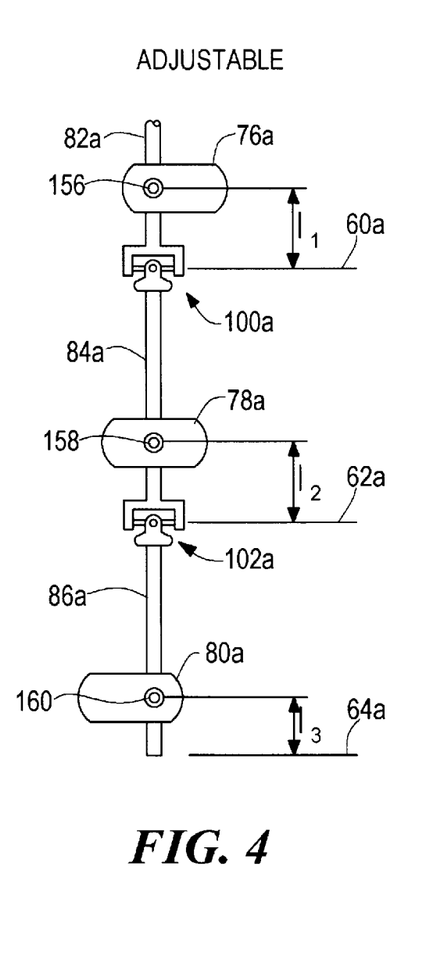
FIG. 4 is a schematic top plan view of a portion of a traveling wave generator according to this invention showing the differential placement of the cams along the shafts to vary the envelope in which the propagating wave travels.
Figure 5:
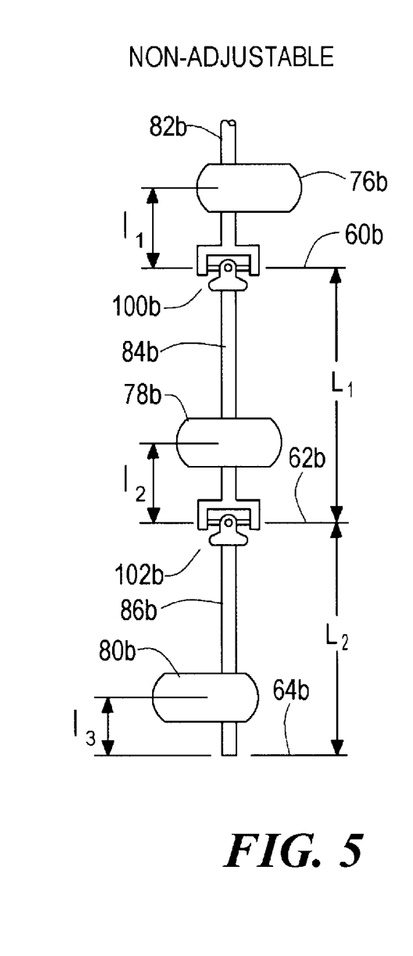
FIG. 5 is a schematic top plan view of a portion of another embodiment of the traveling wave generator of this invention showing the links having different lengths for defining the envelope in which the traveling wave propagates.
Figures 7, 8:
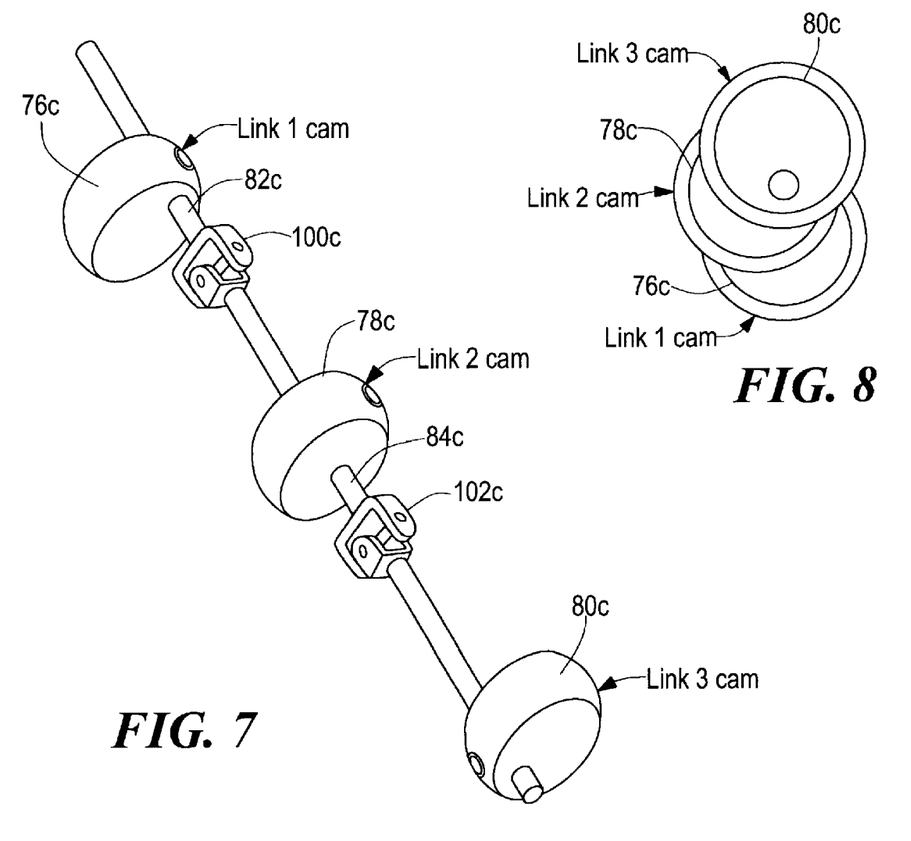
FIG. 7 is a three dimensional schematic view showing the relative phase relationship of the cams in accordance with this invention.
FIG. 8 is an end view of the device of FIG. 7 showing the relative phase relationship of the cams.
Figure 9:
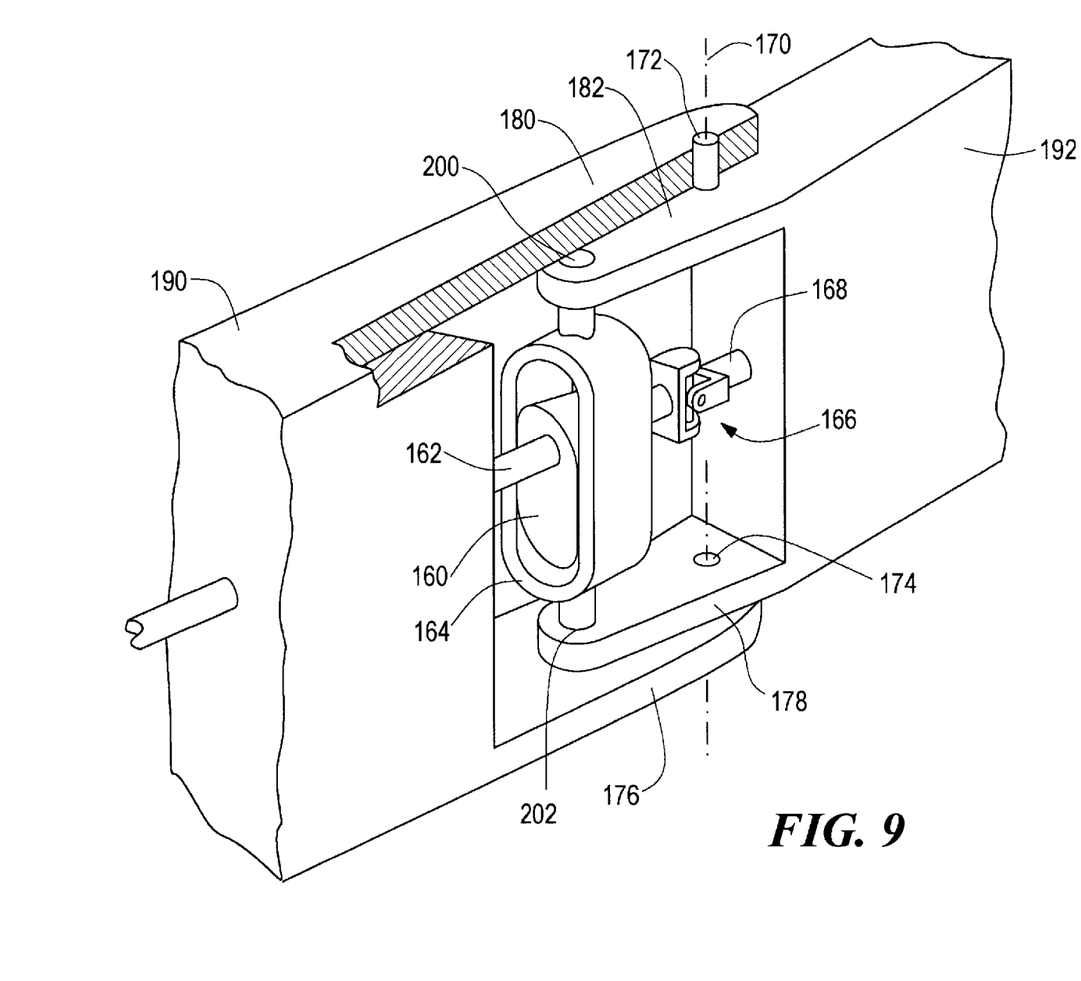
FIG. 9 is a three dimensional diagrammatic view of an alternative cam arrangement according to this invention.

Although thus far the cams have been shown as spherical in FIGS. 1 and 2 and semispherical in FIGS. 4, 5, and 7, this is not a necessary limitation of the invention. For example, as shown in FIG. 9, the cam 160 shown illustratively mounted on its shaft 162 may be of basically cylindrical shape, and operate and engage a follower 164. Shaft 162 continues out the other side of cam 160 and engages a universal joint 166 which drives the next shaft 168 in the series. Universal joint 166 once again aligns with the axis 170 of hinge pins 172 and 174, which pivotably interconnect the lower arms 176, 178, and upper arms 180, 182 of the adjacent links 190, 192. But in this case the follower itself is pinned or journaled by pins 200 and 202 so that follower 164 can rotate to accommodate non-spherical cam 160 even when links 190 and 192 are at an angle to each other.

Figure 10:
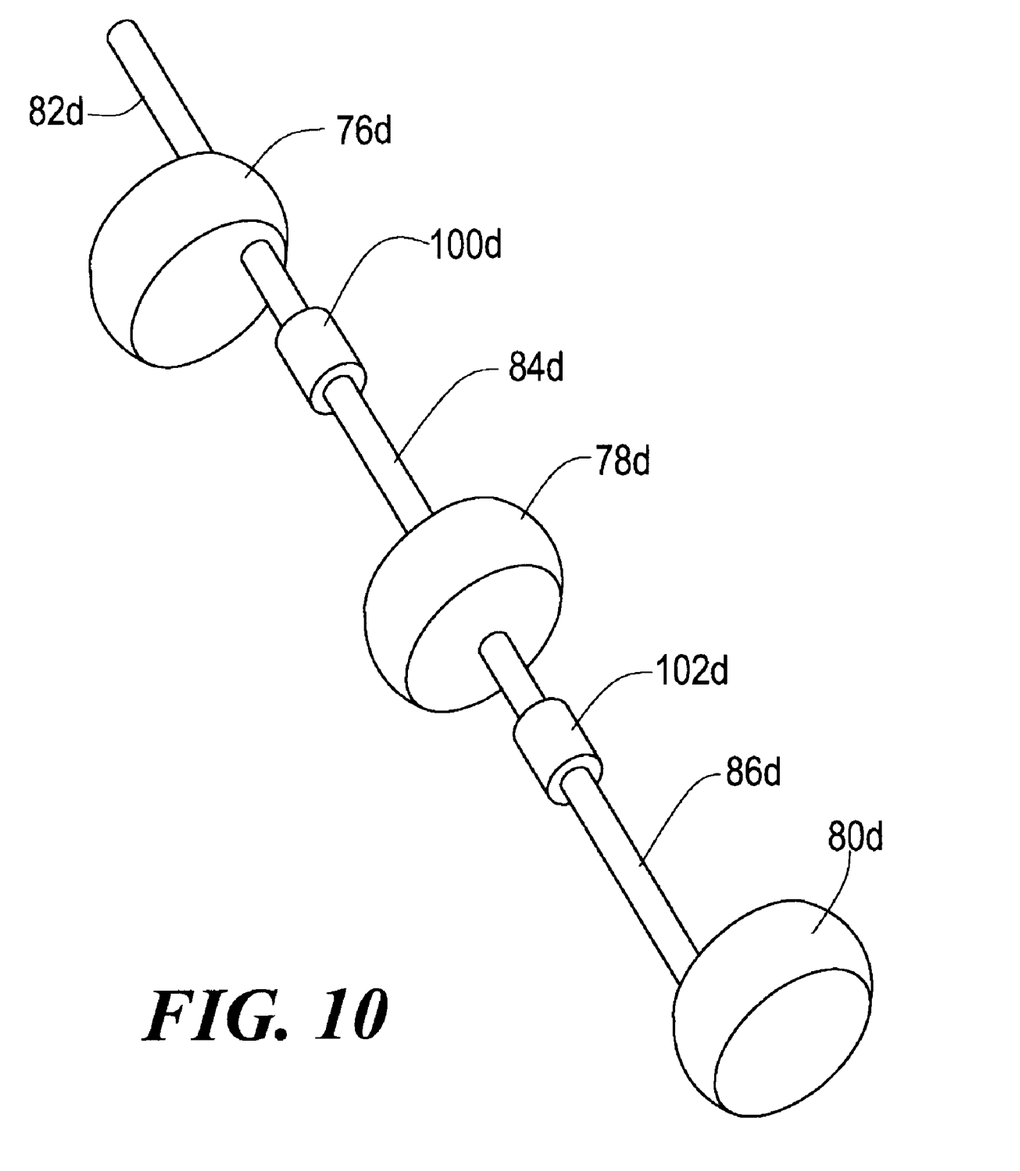
FIG. 10 is a view similar to FIG. 7 but employing constant velocity joints instead of universal joints as the flexible power transmission device.
Figure 11A:
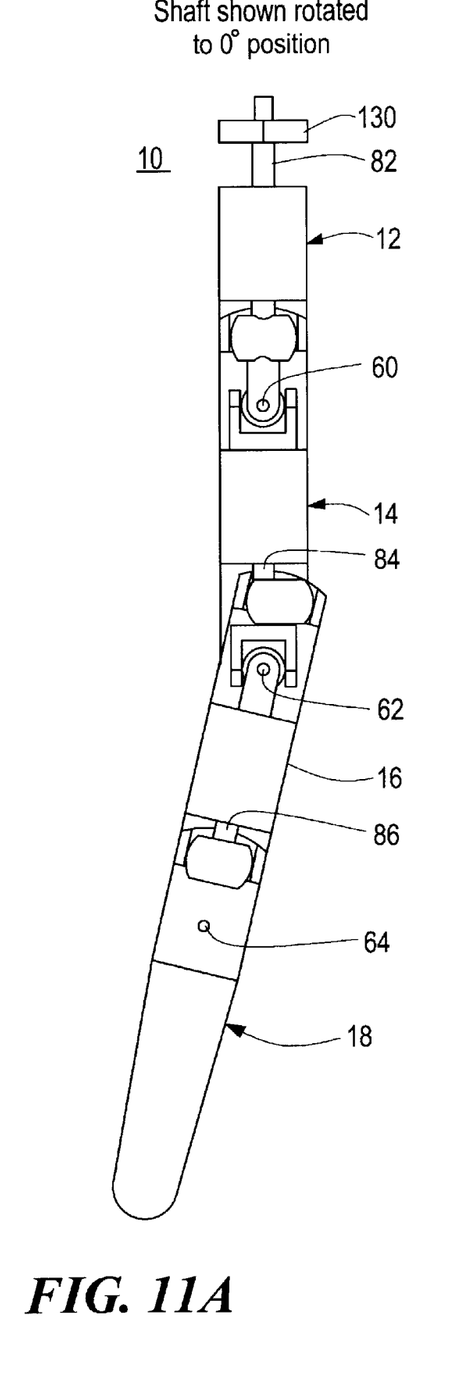
FIGS. 11A–M illustrate a cycle of motion of the traveling wave generator of FIGS. 1 and 2 as the shaft is rotated through 180°.
Figure 11B:
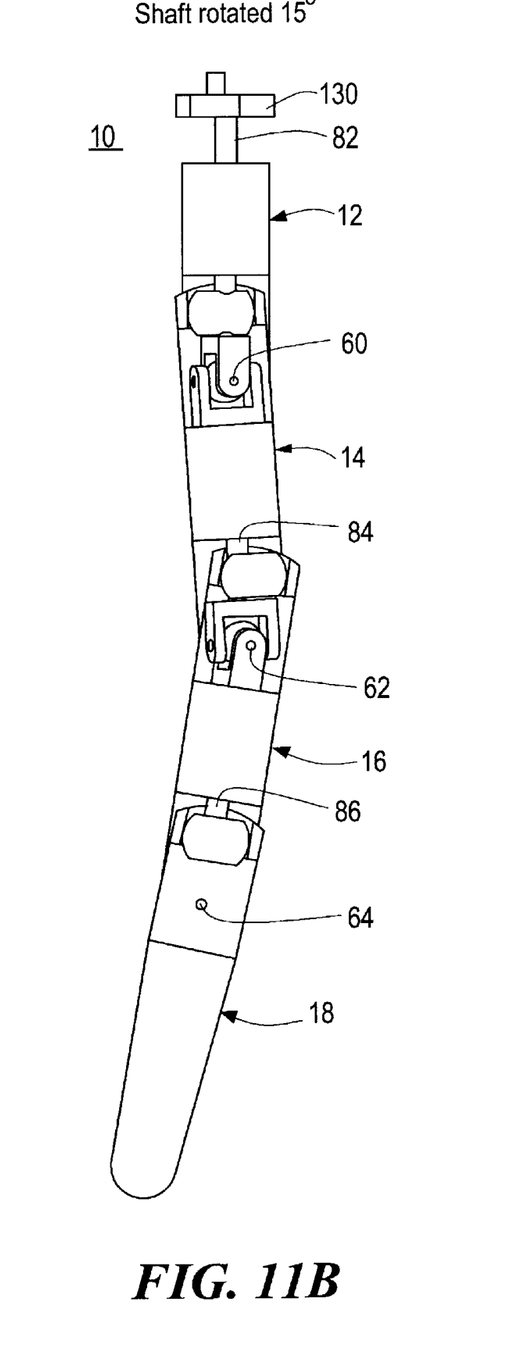
Figure 11C:
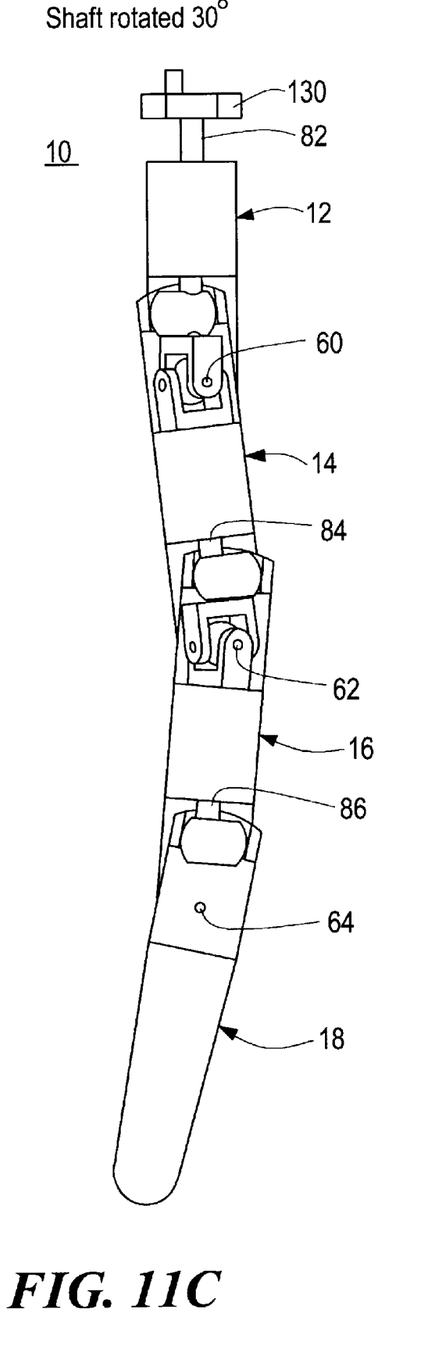
Figure 11D:
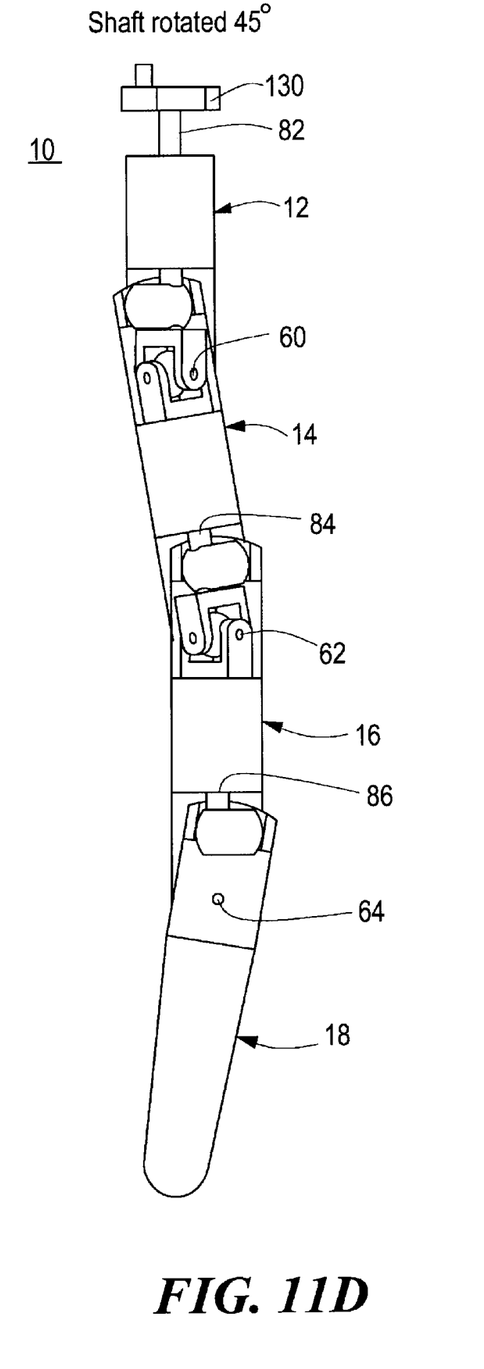
Figure 11E:
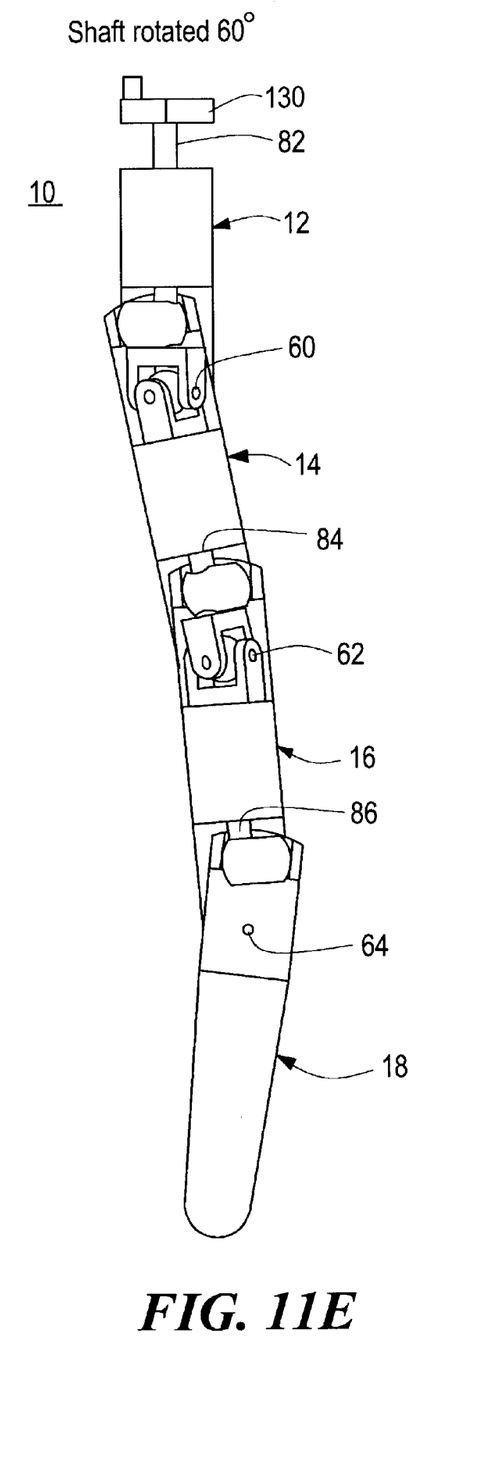
Figure 11F:
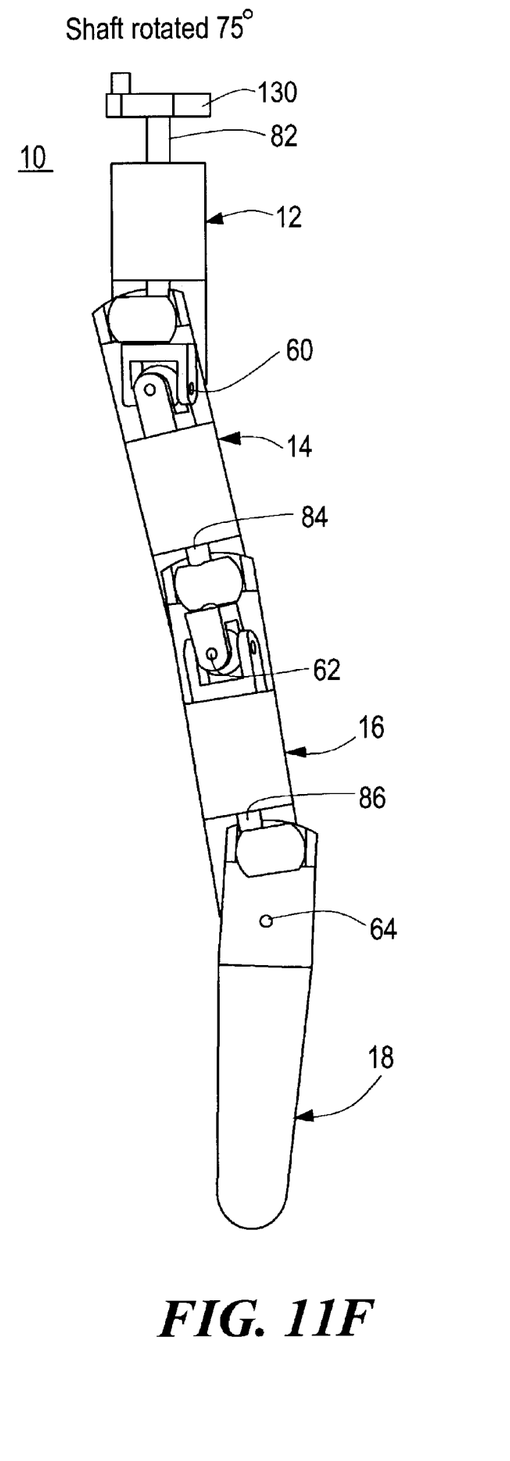
Figure 11G:
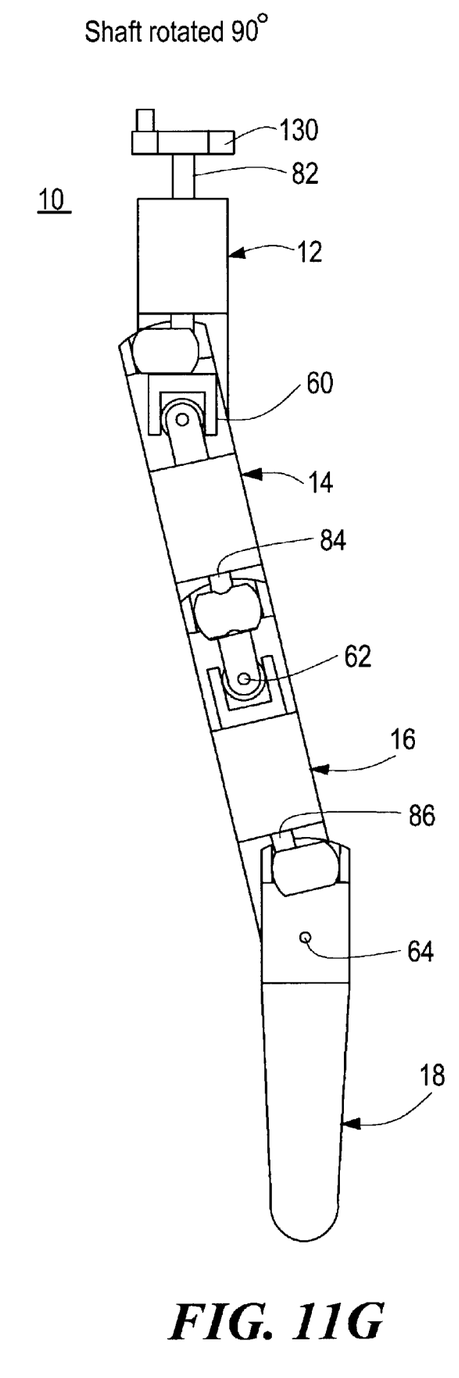
Figure 11H:
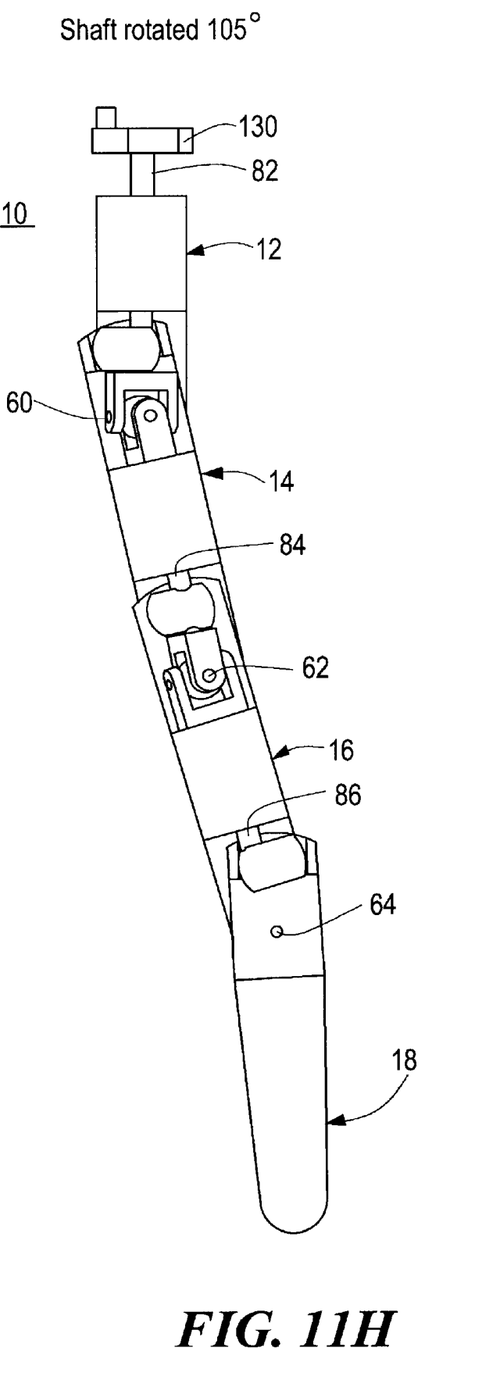
Figure 11I:
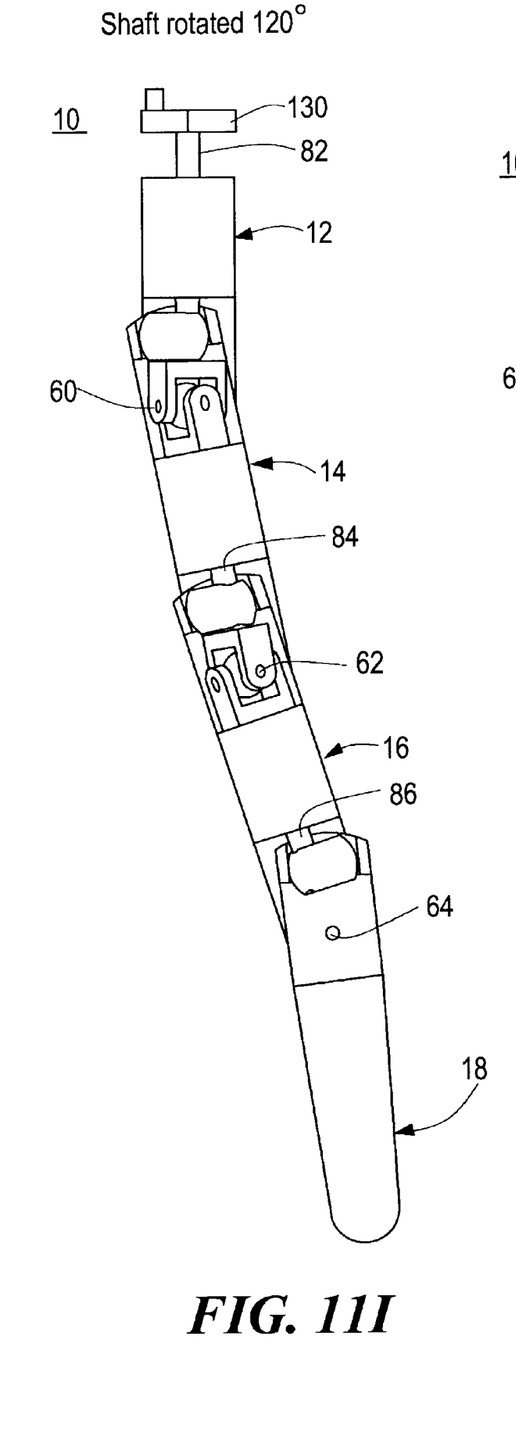
Figure 11J:
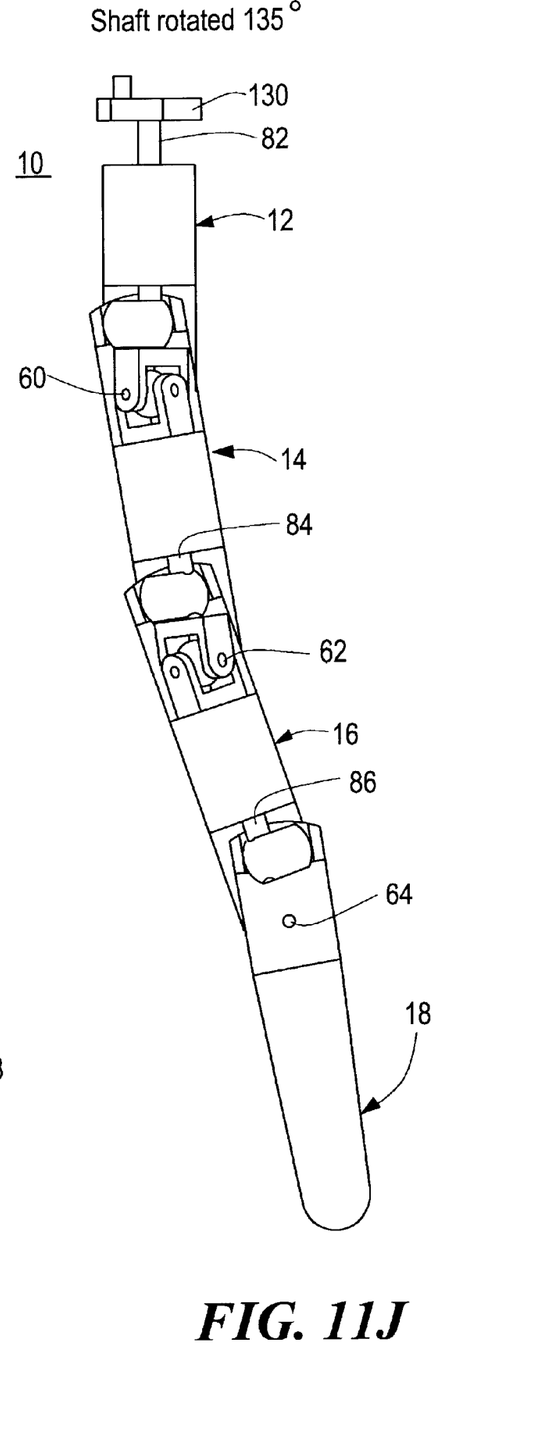
Figure 11K:
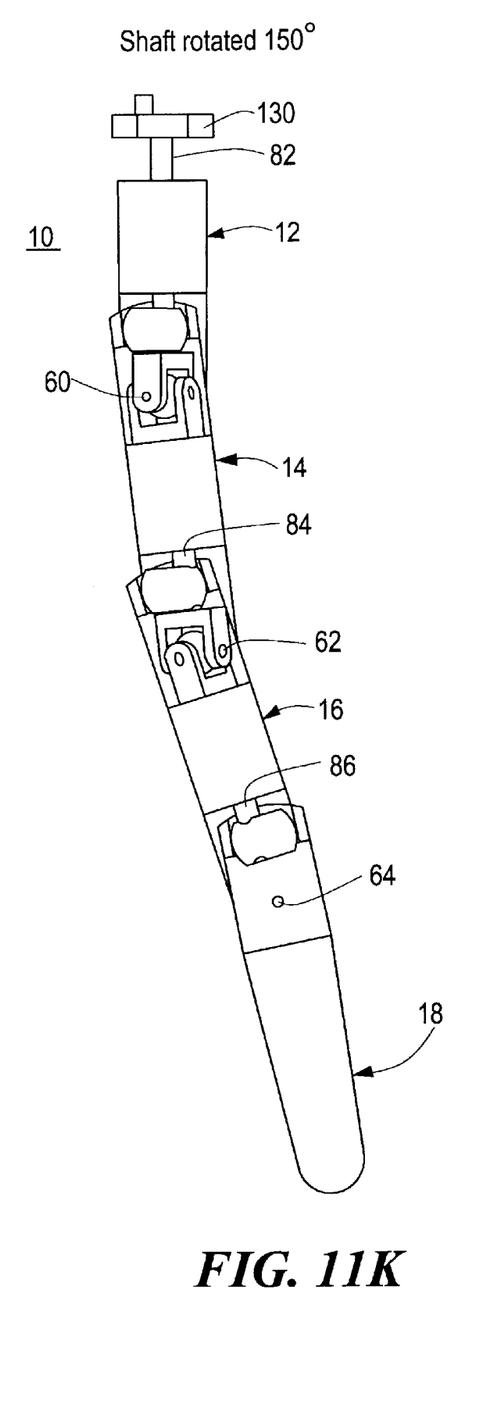
Figure 11L:
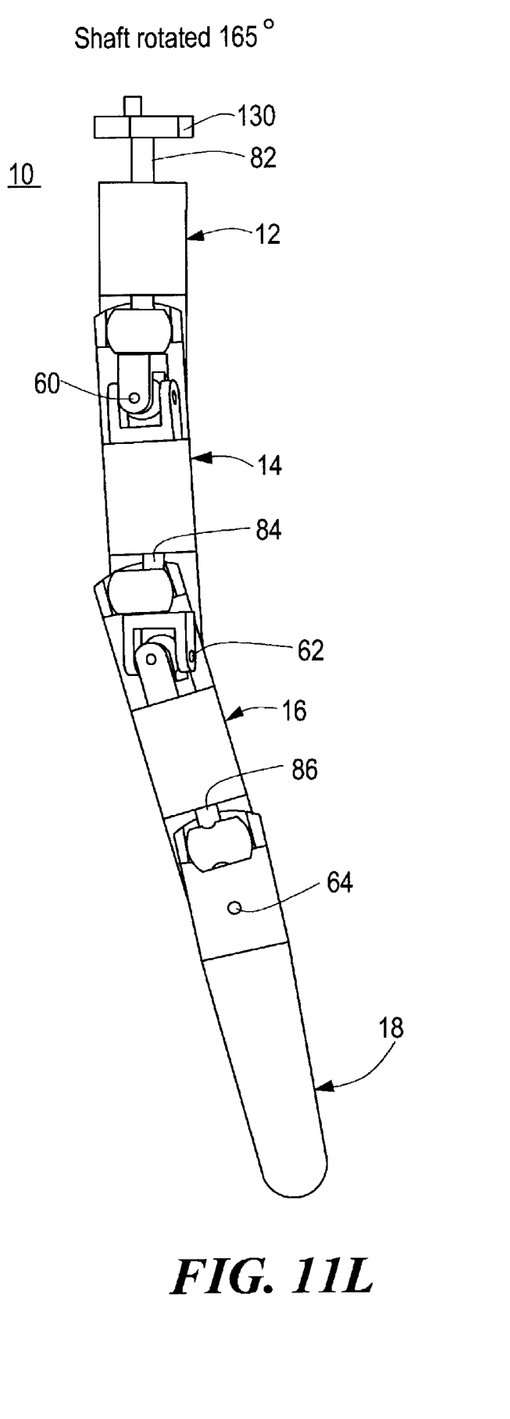
Figure 11M:
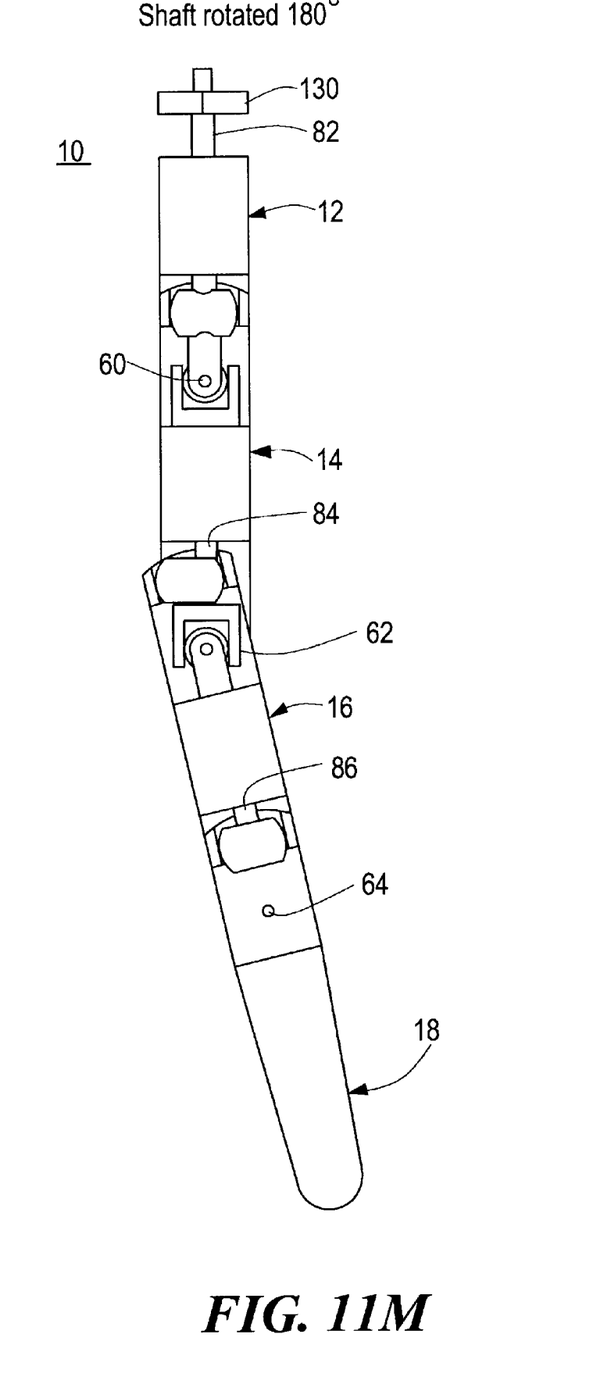

Although thus far the flexible power transmission has been depicted only as a universal joint as indicated, any number of similar devices can be used. For example a constant velocity joint 100*d*, 102*d* may be used, FIG. 10. The traveling wave motion of the device can be seen by reference to FIGS. 11A–M showing the operation of the links through 180° of shaft rotation by means of, for example, hand crank 130.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

Other embodiments will occur to those skilled in the art and are within the following claims:

What is claimed is:

1. A traveling wave generator comprising:
   at least a base link, an end link and an intermediate link;
   a pivot device pivotably interconnecting each pair of links;
   a drive mechanism interconnecting each pair of links including a drive shaft and a cam on a first link of the pair and on the second link of the pair a follower for engaging the cam for inducing a traveling wave motion in the links;
   a flexible power transmission device for interconnecting the shafts of each of the base and intermediate links; and
   a motive source for rotating the shafts.

2. The traveling wave generator of claim 1 in which the pivot devices are in the same plane and the induced traveling wave is in a single plane.

3. The traveling wave generator of claim 1 in which the cam is spherical.

4. The traveling wave generator of claim 1 in which the cam is semispherical.

5. The traveling wave generator of claim 1 in which the drive mechanism includes an adjustment device for setting the relative phase orientation of the cams on their shafts to define the wavelength of the traveling wave.

6. The traveling wave generator of claim 1 in which the position of the cams along their shafts to define the envelope within which the traveling wave propagates.

7. The traveling wave generator of claim 1 in which the flexible power transmission device includes a universal joint.

8. The traveling wave generator of claim 1 in which the flexible power transmission device includes a constant velocity joint.

9. The traveling wave generator of claim 1 in which the axes of the flexible power transmission devices are aligned with the associated pivot devices in each link.

10. The traveling wave generator of claim 1 in which the motive source drives the shaft of the base link.

11. The traveling wave generator of claim 1 in which the links have different lengths for defining the envelope within which the traveling wave propagates.

12. The traveling wave generator of claim 1 in which the cam is cylindrical.

13. The traveling wave generator of claim 12 in which the follower is pivotably interconnected to its link.

* * * * *